United States Patent [19]

Dieterich et al.

[11] 4,105,594

[45] Aug. 8, 1978

[54] HIGHLY FILLED POLYUREA FOAMS

[75] Inventors: Dieter Dieterich, Leverkusen; Peter Markusch, Cologne, both of Germany

[73] Assignee: Bayer Aktiengesellschaft, Leverkusen, Germany

[21] Appl. No.: 687,579

[22] Filed: May 18, 1976

[30] Foreign Application Priority Data

May 31, 1975 [DE] Fed. Rep. of Germany ....... 2524191

[51] Int. Cl.$^2$ .................... C08G 18/10; C08G 18/14; C08K 3/36
[52] U.S. Cl. .................................. 521/100; 521/112; 521/102; 521/109; 521/106; 521/122; 521/159; 521/161; 521/162
[58] Field of Search .................... 260/2.5 AK, 2.5 AD

[56] References Cited

U.S. PATENT DOCUMENTS

| | | | |
|---|---|---|---|
| 3,781,231 | 12/1973 | Janssen | 260/2.5 AD |
| 3,833,386 | 9/1974 | Wood | 260/2.5 AK |
| 3,897,372 | 6/1975 | Kehr | 260/2.5 AK |
| 3,904,557 | 9/1975 | Guthrie | 260/2.5 AK |
| 3,959,191 | 5/1976 | Kehr | 260/2.5 AD |
| 3,965,051 | 6/1976 | Markusch | 260/2.5 AK |
| 3,975,316 | 8/1976 | Villa | 260/2.5 AK |
| 3,981,831 | 9/1976 | Markusch | 260/2.5 AD |
| 3,983,081 | 9/1976 | Dieterich | 260/2.5 AJ |
| 4,066,578 | 1/1978 | Murch | 260/2.5 AK |

*Primary Examiner*—C. Warren Ivy
*Attorney, Agent, or Firm*—Gene Harsh; Joseph C. Gil

[57] ABSTRACT

The instant invention relates to hydrophobic inorganic-organic lightweight foams produced from aqueous suspensions of finely divided water-insoluble inorganic materials and polyisocyanates. More particularly, the invention relates to a process for the production of highly filled, hydrophobic, lightweight polyurea foams comprising reacting (a) liquid, water insoluble polyisocyanates free from ionic groups, having viscosities of more than 200 cP at 25° C and having isocyanate functionalities of greater than 2.1, with (b) an aqueous suspension of inorganic filler, said suspension having a solids content of from 30 to 80 percent by weight and having a pH value of above 8, at least 50 percent by weight of the suspended fillers having a particle size of less than 50 microns, (c) in the presence of the foam stabilizer of the polyether/polysiloxane type and in the presence of a tertiary amine catalyst, the weight ratio of components (b) to component (a) being better 1:2 and 6:1.

8 Claims, No Drawings

HIGHLY FILLED POLYUREA FOAMS

BACKGROUND OF THE INVENTION

Filled polyurethane foams of various kinds are already known. For example, U.S. Pat. No. 3,772,219 describes a soft polyurethane foam filled with powdered limestone which is an inexpensive starting material suitable for the production of foam chips which may be processed into composite chip material. A polyol filled with powdered limestone is used for the production of foams of this kind, being mixed and reacted with a polyisocyanate in the usual way. One of the disadvantages of the process, however, is that the viscosity of the polyol is increased by the inorganic additive, with the result that in conventional foam recipes, it is only possible to use polyols of very low viscosity. In addition, the burning properties of the resulting foams are adversely affected, because no polyol can be saved and the filler has a wicklike effect. Finally, the quantity of limestone which can be introduced into the system is heavily restricted, mainly due to viscosity problems.

According to Japanese Patent Application 48/49 842 (as laid open to inspection), wood substitutes (for example boards) are produced by a pressing technique from mixtures of an inorganic filler, (for example gypsum), and a mixture of polyurethane foam components. Although these products would appear to behave favorably in the presence of a flame, they cannot be produced by conventional foam-producing methods and, once again, contain as one of their constituents a polyether which has an adverse effect with regard to flame propagation and smoke gases. In addition, these products are obviously not foams in the accepted sense, but are more like weakly blown, highly filled plastics.

The same disadvantages apply to the floor-covering compositions described in German Offenlegungschrift No. 2,254,251, which are produced by mixing a filler, such as calcined porcelain earth, glass beads, sand or gravel, with liquid polyurethane-forming mixtures, and by then molding the resulting mixture. In addition, this process obviously utilizes coarsely divided inorganic materials rather than finely divided fillers.

According to French Pat. No. 2,147,839, filler-containing polyurethane foams are produced by impregnating preformed filler-free polyurethane foams with a suspension of a finely divided inorganic filler together with an organic binder. It is clear that a multistage process of this kind is not very attractive from the economic point of view.

It is also known (cf. German Offenlegungsschriften Nos. 2,319,706; 2,328,610 and 2,356,920) that reaction products containing terminal isocyanate groups, of hydrophilic, water-soluble, polyethylene glycol polyethers and polyisocyanates (NCO-prepolymers) can be foamed with a large excess of water. The water used for foaming may also contain inorganic fillers or sinterable ceramic powders. Mixing the highly hydrophilic NCO-prepolymers with the aqueous suspension results initially in the formation of a homogeneous aqueous solution of the isocyanate which contains the filler in suspension. Although the hydrophilic character of the organic components provides extremely good foaming conditions, and although considerable quantities of inorganic fillers may be used without causing viscosity problems, the foams obtained are, of course, also hydrophilic. They are able to absorb considerable quantities of water and, in doing so, swell to a considerable extent. At the same time, the products tend to soften. This range of properties provides numerous potential applications, for example the production of moisture-absorbing materials, materials for the cultivation of plants, hygienic articles, hydrophilic finishes in woven and non-woven textile materials, and the like. On the other hand, materials of this kind cannot be used for applications requiring low water absorption, dimensional stability and long-term stability under the effect of moisture.

It is also known (cf. for example German Offenlegungsschrift No. 2,113,042) that cement compositions or mortars can be produced by mixing an hydraulic cement, a silica filler especially sand, water and a polyisocyanate and molding the pasty mixture thus obtained. Polymer concretes having a high resistance to chemicals are obtained in this way, being used in particular for the production of floor coverings. The products are compact or weakly porous. Foams cannot be produced by this process. The processing technology corresponds to that of concrete.

Finally, it is known that inorganic-organic foams can be produced from polyisocyanates and aqueous solutions of alkali silicates. Hydraulic or inert powder-form inorganic fillers may also be used. In this process, the aqueous solution of the alkali silicate is an essential constituent, especially so far as stabilizing the foam is concerned. It is possible by this process to produce excellent hard foams which are suitable, for example, for the building sector. One disadvantage of this process, however, is that the compatibility of aqueous alkali silicate solutions with a number of fillers is inadequate. The fillers either have to be mixed with the polyisocyanate or have to be added in dry form as a third component. This procedure seriously restricts the production of products of this type in conventional foaming machines. In addition, the mixture of polyisocyanate and fillers causes storage and stability problems.

It has already been proposed (Belgian Pat. No. 822,697) to produce foams from ionic polyisocyanates, water and inorganic fillers. Foams of this kind are substantially free from water-soluble salts and behave very favorably in the presence of a flame. Calcium hydroxide suspended in water, for example, has been used to fill foams of this kind. Foams of this type are readily produced by mixing the ionic isocyanate with water and the inorganic filler. Blowing agents may also be added. The resulting products generally have densities greater than 200 kg/m$^3$ and show very good mechanical properties, and more especially, high compressive strength. The limits to this process for the production of highly filled polyurea ionomers are imposed both by the nature of the polyisocyanates used and also by the property spectrum of the foams obtained. For example, it is not possible to produce satisfactory highly filled lightweight foams of the kind required for insulating purposes or as shock-absorbing packing foams. Densities of less than 200 kg/m$^3$ can only be obtained with difficulty and also result in an unfavorable coarse-pored cell structure, so that the foams obtained show an inadequate heat-insulating capacity.

In addition, difficulties arise when standard commercial-grade unmodified and/or hydrophobic polyisocyanates are used instead of the ionic polyisocyanates. Mixing difficulties arise, and, the emulsions of water, filler and polyisocyanate initially formed tend to disintegrate. In addition, it is difficult to obtain adequate activation which is a particularly important factor with regard to the physical instability of the primary emulsion. Since both hard insulating, lightweight foams and also shock-absorbing, packing foams are required to show a high degree of hydrophobicity and dimensional stability under the action of water, it is not possible to use hydrophilic polyisocyanates of the type described, for example, in German Offenlegungsschrift No. 2,319,706.

For the reasons explained above, it has not yet been possible to produce lightweight polyurea foams (i.e. densities of from 10 to 200 kg/m$^3$) from aqueous filler suspensions and hydrophobic polyisocyanates on a commercial scale, although foams of this type are of considerable interest from the economic point of view, and in addition, show extremely favorable burning properties.

Hitherto, it has only been possible to produce highly filled polyurea foams in combination with relatively large quantities of waterglass. The waterglass acts as reactant and, because of its high reactivity and its gellability, enables highly filled polyurea/silicate foams to be produced. On the one hand, however, waterglass is incompatible with a number of fillers, as already mentioned, so that it is not possible to prepare premixes and the filler has to be separately added as a third component. On the other hand, the use of waterglass may be undesirable, for example, because the foam, as a result, contains relatively large quantities of salts and because the dimensional stability of the foams under the effect of moisture is unsatisfactory. Accordingly, it would be desirable to be able to produce highly filled inorganic-organic polyurea foams without any need to use waterglass as reaction component. However, since waterglass behaves almost ideally in regard to its handling properties, stability, pumpability and miscibility and also in regard to its emulsifiability, and shows outstanding foamability with polyisocyanates, there is a commercial need to be able to use inexpensive inorganic fillers in a corresponding manner as a reactive component for the production of hydrophobic polyisocyanate-based lightweight foams. The present invention provides a solution to this problem.

DESCRIPTION OF THE INVENTION

It has now surprisingly been found that hydrophobic, highly filled inorganic-organic lightweight polyurea foams may be produced without difficulty from polyisocyanates, inorganic finely divided fillers and water, so long as the organic polyisocyanate used is free from ionic groups, has a viscosity of more than 200 cP and has a functionality of more than 2.1, so long as the fillers are used in the form of 30 to 80% by weight aqueous suspensions having a pH-value above 8, and so long as production is carried out in the presence of foam stabilizers of the polyether/polysiloxane type and in the presence of tertiary amines as activators.

Accordingly, the present invention, more particularly, relates to a process for the production of highly filled, hydrophobic lightweight polyurea foams from polyisocyanates, water, catalysts, stabilizers and finely divided inorganic fillers, distinguished by the fact that liquid water-insoluble polyisocyanates free from ionic groups and having viscosities of more than 200 cP and functionalities of greater than 2.1, are mixed with 30 to 80% by weight of aqueous [liquid-fluid] suspensions of inorganic fillers having a pH-value above 8, in the presence of foam stabilizers of the polyether/polysiloxane type and tertiary amine catalysts, at least 50% by weight of the suspended fillers having a particle size of less than 50 microns and the ratio by weight of filler-suspension to polyisocyanate amounting to between 1:2 and 6:1.

Particularly preferred polyisocyanates have an NCO-content of from 10 to 35% by weight. Where the polyisocyanates are modified with polyols or monoalcohols, the modifying component is present in a proportion of preferably less than 60% by weight and, more especially, less than 30% by weight.

In addition, it is preferred to use inorganic fillers of the type in which at least 50% by weight consists of particles having a particle size of less than 10 microns. Filler suspensions stabilized against sedimentation are also preferably used.

So far as the criterion of viscosity is concerned, any polyisocyanates having a viscosity of more than 200 cP at 25° C are suitable. For processing reasons, however, the viscosity range from 400 to 10,000 cP/25° C, more especially from 500 to 6,000 cP/25° C, is preferred.

In cases where the polyisocyanates used are of higher viscosity, resin-like or even solid, the required viscosity may be adjusted by adding low-viscosity polyisocyanates and/or inert organic solvents.

Highly viscous, resin-like or solid polyisocyanates of this type are suitable for use in accordance with the invention, providing they have a viscosity of more than 200 cP/25° C in the form of dilute solutions and providing the polyisocyanate component has a functionality of greater than 2.1.

Suitable liquid organic polyisocyanates free from ionic groups which, as such, satisfy the above viscosity and functionality requirements are in particular the readily available polyphenyl polymethylene polyisocyanates of the type obtained by condensing aniline with formaldehyde, followed by phosgenation. The required viscosity of more than 200 cP/25° C may be adjusted, for example, simply by pre-adjusting a suitable aniline:-formaldehyde ratio, or, if the phosgenated product does not have the high viscosity required, by partly distilling off the binuclear products. Other phosgenation products of aryl amine-aldehyde condensates are, of course, also eminently suitable.

Examples of this class are, for example, the phosgenation products of condensates of aniline and aldehydes or ketones, such as acetaldehyde, propionaldehyde, butyraldehyde, acetone, methylethyl ketone, and the like. It is also possible to use the phosgenation products of condensates of anilines alkyl-substituted on the nucleus, more especially toluidines, with aldehydes or ketones such as, for example, formaldehyde, acetaldehyde, butyraldehyde, acetone, methylethyl ketone.

Polyisocyanates of this type are particularly preferred for the process according to the invention. Their functionality is preferably between 2.2 and 3. Their binuclear content preferably amounts to less than 50%. Solutions of residual isocyanates in monomeric polyisocyanates are also suitable. In the context of the invention, residual isocyanates are in particular the highly viscous, resin-like or solid distillation residues which accumulate, for example, in the production of tolylene diisocyanate, diphenyl methane diisocyanate or hexamethylene diisocyanate.

Residual diisocyanates of this type, of which the average functionality is always greater than 2.1 and preferably between 2.2 and 3, may be adjusted to the viscosity required for processing by admixture with, for example, standard commercial-grade low-viscosity diisocyanates. Mixtures of the residual isocyanates with one another may also be used, providing liquid products are obtained. Solutions of highly viscous or solid residues in inert organic solvents are also suitable. In one preferred procedure, the inert organic solvents used are of the type which have a boiling point of from $-25°$ to $+80°$ C and which may be used as blowing agents in the production of foams in accordance with the invention.

Another group of suitable polyisocyanates are the so-called "modified polyisocyanates", i.e. polyisocyanates containing carbodiimide groups, allophanate groups, isocyanurate groups, urea groups or biuret groups.

Polyisocyanates suitable for modification in this way are, for example, aliphatic, cycloaliphatic, araliphatic, aromatic and heterocyclic polyisocyanates of the type described, for example, by W. Siefken in Justus Liebigs Annalen der Chemie, 562, pages 75 to 136. Examples include ethylene diisocyanate, 1,4-tetramethylene diisocyanate, 1,6-hexamethylene diisocyanate, 1,12-dodecane diisocyanate, cyclobutane-1, 3-diisocyanate, cyclohexane-1,3- and 1,4-diisocyanate and mixtures of these isomers, 1-isocyanato-3,3,5-trimethyl-5-isocyanatomethyl cyclohexane (German Auslegeschrift etc. No. 1,202,785 and U.S. Pat. No. 3,401,190) 2,4- and 2,6-hexahydrotolylene diisocyanate and mixtures of these isomers, hexahydro-1,3, and -1,4-phenylene diisocyanate, perhydro-2,4'- and/or 4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate, naphthylene-1,5-diisocyanate, triphenylmethane-4,4', 4''-triisocyanate, polyphenyl polymethylene polyisocyanates of the type which are obtained by condensing aniline with formaldehyde, followed by phosgenation, and which are described, for example, in British Pat. Nos. 874,430 and 848,671, and perchlorinated aryl polyisocyanates of the type described in U.S. Pat. No. 3,277,138.

The modification of these polyisocyanates is carried out in known manner either thermally and/or catalytically, optionally in the presence of, for example, air, water, urethanes, alcohols, amides or amines.

Monofunctional low molecular weight alcohols (preferably having 1 to 12 carbon atoms, such as methanol, ethanol, n- and iso-propanol, butanol, hexanol, n-octyl alcohol, dodecyl alcohol), may also be used as modifying agents, providing the urethane groups formed are converted into allophanate groups by further reaction with isocyanate present, so that the functionality of the resulting modified polyisocyanate is not undesirably reduced.

Modifications of this kind to low-viscosity polyisocyanates ensure the viscosity of more than 200 cP/20° C required in accordance with the invention. However, when the above-mentioned modifying agents are used, the degree of modification selected should not under any circumstances be so high that the resulting polyisocyanates have a hydrophilic character. The term "Hydrophilic character" denotes solubility of the polyisocyanate in water or solubility of water in the polyisocyanate. With polyisocyanates of this kind polyurea foams are formed which absorb water while softening and swelling at the same time.

Since the formation of such hydrophilic foams must be avoided the polyisocyanates used should not contain hydrophilic groups in an amount impairing the hydrophobic properties of the foam. If hydrophilic modifying agents, such as polyether alcohols containing ethylene oxide units, are used, the amount of such ethylene oxide units of the formula $-CH_2-CH_2-O$ in the modified polyisocyanate should not be higher than 20% (preferably 1–10%) by weight. Most preferably the polyisocyanates used in the present invention do not contain any polyether units at all. With the small quantities of low molecular weight modifying agent normally used in practice, i.e less than 10% by weight, based on the polyisocyanate, polyisocyanates without any hydrophilic properties are generally obtained. It is particularly preferred to use adducts of the polyisocyanates with themselves, such as uretdiones, isocyanurates, carbodiimides, which are readily obtainable from monomeric polyisocyanates, accompanied by an increase in molecular weight, and which satisfy the requirement of a minimum viscosity of 200 cP/25° C.

In general, it is entirely adequate for this adduct formation to be completed to a low percentage, for example to between 3 and 50% by weight, based on the total quantity, in order to obtain the required viscosity range.

Polyisocyanates which are also suitable, although less preferred, for use in the process according to the invention are the semi-prepolymers and prepolymers obtainable by the so-called isocyanate polyaddition process, providing they meet the requirements according to the invention in regard to viscosity and functionality.

Semi-prepolymers and prepolymers, which may be obtained by reacting polyisocyanates with compounds containing isocyanate-reactive hydrogen atoms, have been repeatedly described and are commonly known in the art. Examples of suitable compounds containing isocyanate-reactive hydrogen atoms are alcohols, glycols or even polyols of relatively high molecular weight, such as polyesters; mercaptans; carboxylic acids; amines; ureas; and amides.

Prepolymers of this kind should always contain terminal isocyanate groups, but should not have an ionic centre.

Suitable polyesters containing hydroxyl groups include reaction products of polyhydric (preferably dihydric) and, optionally, even trihydric alcohols with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated. Examples of polycarboxylic acids of this kind are succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids, such as oleic acid, optionally in admixture with monomeric fatty acids; terephthalic acid dimethyl ester or terephthalic acid-bis-blycol ester.

Particularly suitable prepolymers are reaction products of polyisocyanates with monohydric or polyhydric alcohols. In cases where only monoalcohols, for example methanol, ethanol, n-propanol and n-butanol, are used, it is important to ensure that either polyisocyanates with a functionality of greater than 2.1 are used and/or that the prepolymerisation reaction is also accompanied by allophanate-forming, isocyanurate-forming reactions or other reactions which increase functionality. In any event, it is important to ensure that the average functionality of the resulting prepolymers is greater than 2.1.

The prepolymerisation reaction carried out in the usual way gives prepolymers which frequently have a viscosity of more than 2000 cP and, in some cases, of as high as 10,000 cP/25° C and higher. In cases where viscosities as high as these are not advantageous to further processing the viscosity can be reduced by adding low viscosity isocyanates or even inert solvents.

However, polyisocyanates which are particularly preferred in accordance with the invention are the liquid distillation residues of the already mentioned polyphenyl polymethylene polyisocyanates having a viscosity of from 200 to 10,000 cP/25° C, preferably from 500 to 6000 cP/25° C, which have an average functionality of greater than 2.1.

The above-mentioned polyisocyanates may also be modified to a limited extent by hydrophilic, non-ionic alcohols or polyols. Examples of modifying agents such as these are polyethers which are synthesised from alcohols having a functionality of from 1 to 3 and ethylene oxide and/or propylene oxide and which contain terminal OH-groups. Polycarbonates based on diethylene glycol, triethylene glycol, tetraethylene glycol and, optionally, copolycarbonates with hydrophobic monomers may also be used. Hydrophilic polyester segments synthesised, for example, from diethylene glycol, triethylene glycol, oxalic acid or succinic acid, may also be used for modifying the polyisocyanates. The proportion of this modifying component in the resulting polyisocyanate should amount to less than 60% by weight and preferably less than 30% by weight, the amount of —$CH_2$—$CH_2$—O— units being not higher than 20% by weight.

As already mentioned, the functionality of the polyisocyanates used in accordance with the invention should also amount to at least 2.1 even after modification. This means that, especially where modification is carried out with monofunctional alcohols, it is necessary to start with a sufficiently high functionality, or to use prepolymers in which adequate functionality is guaranteed by allophanate formation.

Suitable finely divided inorganic fillers include, generally, any inorganic materials which are insoluble or substantially insoluble in water and which contain at least 50% by weight of particles having a particle size of less than 50 microns (preferably 50% by weight smaller than 10 microns). It is preferred to use inert mineral fillers and/or hydraulic mineral binders. Examples include calcium hydroxide, magnesium hydroxide, iron hydroxide, aluminum hydroxide, calcium carbonate, magnesium carbonate, chalk, dolomite, calcium oxide, magnesium oxide, calcium sulphate, gypsum, anhydrite, quartz powder, stone powders, ground shale, talcum, satin white, bauxite, kaolin, barium sulphate, barium carbonate, clays, asbestos, silica, silicon dioxide, glasses in powder form, alkaline earth silicates, zeolites, silicate minerals, coal dust, slag, red sludge, brick dust any hydraulic cements such as Portland cement, quick-setting cement, blast-furnace Portland cement, low-calcined cement, sulphate-resistant cement, masonary cement, natural cement, lime cement, gypsum cement, pozzolane cement and calcium sulphate cement. Loam of the type which occurs in nature in many different forms may also be used.

According to the invention, the fillers are used in the form of an aqueous suspension having a solids content of from 30 to 80% by weight. Providing the dry fillers already satisfy the requirements according to the invention in regard to particle size (at least 50% by weight smaller than 50 microns), they may be directly stirred with water to form a suspension. If the particles are coarser, it is even possible to convert an aqueous coarse suspension of the fillers into a fine suspension suitable for use in accordance with the invention by the well-known wet-grinding methods.

Particularly preferred aqueous suspensions are those which have a certain stability against sedimentation and which show a viscous quick-flow behavior resembling, for example, that of paper coating compositions. Accordingly, the filler suspensions in question are advantageously produced by the methods commonly known in the art for the production of coating compositions of this kind.

Stabilised suspensions preferably used in accordance with the invention are those which do not undergo any appreciable sedimentation over a period of two days and which show viscous quick-flow behavior. In the context of the invention, aqueous filler suspensions are "stabilised" when the dispersed fillers are dispersed in the form of individual particles substantially free from agglomerates by one or more of the following measures:

1. Using extremely finely divided fillers having a particle size of less than 20 microns, of which at least 50% by weight have a particle size of less than 2 microns. Particularly useful fillers are fillers of which 80% have a particle size of from 0.5 to 2 microns, as is the case, for example, with a number of calcium carbonates and iron oxides.
2. Using surface-modified fillers which are hydrophilised and, then, can be more effectively dispersed in water.
3. Preparing the dispersion with the aid of agglomerate-destroying shear forces as is normally the case, for example, in the production of pigment pastes and with pigmented lacquer systems, for example by grinding on a three-roll stand, a sand mill or the like.
4. Using dispersion aids and dispersion stabilisers such as, for example, salts of any of the following acids: phosphoric acid, pyrophosphoric acid, metaphosphoric acid, polyphosphoric acids, phosphorous acids, oligosilicic acids, polysilicic acids, organic high molecular weight polyacids such as, for example, (poly(meth) acrylic acids, copolymeric poly(meth)acrylic acids, polymaleic acids, and copolymeric polymaleic acids; water-soluble derivatives of casein, cellulose, starch, alginic acids and plant gums. The usual surface-active compounds such as emulsifiers, wetting agents and surfactants, may also be used. Bentonite can be used as a stabilizer as well.
5. Using thickeners, such as cellulose derivatives, polyacrylamine, alginates, plant gums, water-soluble polymers, such as polyethylene oxide.
6. Using high molecular weight and low molecular weight dialcohols or polyalcohols or diamines or polyamines.

It is particularly preferred to use suspensions which have been prepared with an addition of from 0.05 to 20% by weight, based on filler, of one or more of the additives mentioned in 4, 5 and 6 above. It is also possible, although not as desirable from the economic point of view, to use surface-modified and, hence, hydrophilised fillers which generally eliminate the need for additives.

In cases where the filler suspensions are stabilised by organic additives, the quantity in which these additives are used should not exceed 5%, based on filler, in order to avoid adversely affecting the burning properties of the foams.

In cases where suspensions contain the additives mentioned in 4 and/or 5 and/or 6 above and, in addition, have been prepared in accordance with the criteria mentioned in 1 and 3 above, suspensions which have outstanding stability against sedimentation and which have flow properties adapted to the foaming process are obtained.

In cases where filler suspensions stabilised by additives are used, it is preferred to use fillers of the type of which at least 90% by weight have a particle size of less than 20 microns and at least 50% by weight a particle size of less than 10 microns.

The filler suspension may of course also be prepared immediately before admixture with the polyisocyanate, for example by introducing dry fillers and water into a pipe leading to the mixing chamber in which the polyisocyanate is mixed with the filler suspension, and producing the aqueous filler suspension in situ in this pipe by means of a mixing device, for example in the form of a screw.

In cases where hydraulic binders, especially cement are used, the suspensions are generally prepared immediately before foaming with the isocyanate component, because the setting process best takes place in the completed foam. In spite of this, the stabilisers mentioned in 4 to 6 above are preferably added during the preparation of the suspensions because they have a favorable effect upon foaming behavior.

The presence of tertiary amines as activators is necessary in the production of the foams according to the invention from the polyisocyanates and the aqueous filler suspensions, because the predominantly hydrophobic polyisocyanates do not react quickly enough with the aqueous suspension. Catalysts which may additionally be used are those belonging to the classes of compounds known in the art, such as organometallic compounds. Strong inorganic bases are also particularly suitable for use as additional catalysts in accordance with the invention. Additional catalysts of this kind, which may be added to the aqueous filler suspension, include for example sodium hydroxide, potassium hydroxide, calcium hydroxide, barium hydroxide, sodium carbonate, potassium carbonate, and alkali salts of weak inorganic or organic acids, such as tertiary phosphates, borates, sulphites, acetates. Fillers which combine limited solubility in water with a strongly alkaline reaction may take over the function of a catalyst. In spite of this, a tertiary amine has to be added as catalyst, even when products of this kind, such as milk of lime, are used.

According to the invention, it is also important that the pH-value of the aqueous filler suspension, together with the catalyst used, should amount to at least 8 and preferably to at least 9.

This is surprising because this condition does not apply for example to the foaming of hydrophilic or ionically modified isocyanates, and for this reason had not been expected either.

In cases where basic fillers are at least partly used, the suspension generally has a pH-value of at least 8. If this is not the case, a pH-value of at least 8 must be adjusted by the addition of basic substances.

In cases where the tertiary amine used as catalyst is added to the aqueous suspension before foaming, the necessary pH-value generally prevails. If this is not the case, a pH-value of at least 8 must be adjusted by the addition of alkalis, such as potassium hydroxide and sodium hydroxide, basic salts, or even by increasing the quantity of catalyst added.

In cases where the catalyst is separately added or where the catalyst is dissolved in polyisocyanate, the filler suspension may even have a lower pH-value, for example from pH 7 to pH 8, before it is mixed with the other components. However, in the total foaming recipe the pH-value must amount to at least 8. In order to determine whether a filler suspension/catalyst combination is suitable for foaming by the process according to the invention, 100 g of the suspension are mixed with the corresponding quantity of catalyst and the pH-value measured.

The use of finely divided fillers in the form of stabilised suspensions eliminates the disadvantages involved in using dry powders. More importantly, the formation of troublesome dust clouds in and around the mixing, metering and foaming machines is substantially avoided. Particularly preferred suspensions are suspensions stabilized to such an extent that they remain pumpable for days or even weeks and any partial sedimentation can be eliminated at any time by brief stirring. In cases where organic substance, such as polymers, oligomers, emulsifiers or surfactants, are added to the filler suspensions to stabilize them and to adjust their flow properties, it is important to ensure that the quantity in which these organic substances are added does not exceed 5% of organic solids, based on the total solids. Although it is readily possible to use even larger quantities of organic material in the aqueous phase, this is not consistent with the purpose of the invention. Rather it is the object of the invention to produce foams which have as high as possible a content of inorganic non-inflammable material, but which can be produced by the simple technology for the production of polyurethane foams. This result can be achieved by using polyisocyanates as binders, providing the other criteria according to the invention are observed.

The filler suspensions used preferably have a viscosity of more than 100 cP in order to guarantee a rheological behavior which is favorable to foaming. On the other hand, they should be free-flowing and under no circumstances should they have a friable consistency. It is preferred not to exceed a viscosity of 10,000 cP. The viscosity should provide for good, extremely intimate admixture with the polyisocyanate in conventional foaming machines. On the other hand, the filler content of the aqueous suspension should be as high as possible in order not to introduce any more water than is necessary into the foam. The filler solid content in the suspension amounts to between 30 and 80%, depending upon the particle size and shape of the filler particles. A filler content of from 50 to 70% is preferred. Lower concentrations are generally preferred in the case of non-spherical fillers such as asbestos, talcum or clays.

It is also possible initially to prepare from the inorganic fillers, water and optional additives, highly viscous, aqueous filler doughs which can be readily stored and transported, and to dilute these doughs to the necessary viscosity and rheology before foaming with water or thinly liquid suspensions.

Production of the inorganic-organic foams according to the invention is simple. All that is necessary is to mix the liquid polyisocyanate homogeneously with the aqueous filler suspension in the presence of an amine catalyst and a silicone stabilizer. The mixture soon foams and the primary emulsion formed hardens.

The weight ratio in which the filler suspension and the polyisocyanate are mixed is from 1:2 to 6:1 and preferably from 2:3 to 4:1. Although it is possible to use more polyisocyanate, this results in a reduction in the inorganic constituents and adversely affects burning properties.

The finely divided inorganic filler content of the foams should amount to between 30 and 85%.

The foaming process is initiated by the carbon dioxide formed during the reaction between polyisocyanate and water. However, it is of course also possible to use additional blowing agents such as, for example, hydrocarbons, fluorchlorinated hydrocarbons, air, nitrogen, hydrogen, and the like.

In cases where large quantities of alkaline fillers absorbing carbon dioxide, such as calcium hydroxide, are present, it is generally necessary to add blowing agents of this kind as additional component. The mixture of the components is not stable. The so-called "pot lives" or "latent times", during which the mixtures are processible, are governed in particular by the type and quantity of catalyst used and by the reactivity of the polyisocyanate. They amount to between 0.2 second and about 30 minutes. Although longer latent times are of course possible, they do have an adverse effect upon the foaming process and, more importantly, upon the quality of the foam. Latent times of from about 2 seconds (spray foam) to 10 minutes are preferred.

It follows from this that mixing is generally carried out immediately before molding.

The novel inorganic-organic polyurea foams may be produced by generally known techniques, for example, in the same way as cast or foamed polyurethanes. Production may be carried out either continuously or in batches. Since reactivity can be controlled within very wide limits by the type and quantity of catalyst added, there is generally no problem in producing even large moldings in batches by adjusting a correspondingly longer pot life.

The components are preferably mixed continuously in a short-dwell mixing chamber in accordance with the technology normally used for the production of polyurethane foams, and subsequently hardened in molds. To this end, the liquid or pasty mixture is, for example poured into molds, applied to surfaces or packed into recesses, joints, gaps, and the like. The mixing ratio between the polyisocyanate and the aqueous filler suspension can vary within wide limits although, in order to obtain products which combine good mechanical properties with favorable burning properties, the ratio by weight of filler suspension to polyisocyanate should amount to between 1:2 and 6:1. A ratio of from 2:3 to 4:1 is preferred.

It follows from the quantitative ratios quoted above that the quantitative ratio of polyisocyanate to filler suspension is not a critical factor in the production of these foams. This is particularly advantageous because, when production is carried out continuously by means of delivery systems and mixing chambers, there is no need to maintain strict dosage. Thus, it is possible to use heavy-duty delivery systems, such as gear pumps or eccentric screw pumps.

In cases where coarse aggregates such as, for example, gravel, sand, broken glass and bricks, chippings, expanded glass, expanded clay and expanded shale are also present during foaming, the components may also be mixed by the standard methods of concrete technology, in which case it is best to apply only very little activation. For example, one of the liquid components, preferably the filler suspension, may initially be mixed with the coarse aggregate in a mixer, the polyisocyanate subsequently mixed in and the heterogeneous mixture formed poured into corresponding molds or cavities where it subsequently hardens while expanding or foaming to completion.

In the production of foams by the process according to the invention, it is also advisable to use expanding agents when neutral or weakly acid fillers are used. In cases where large quantities of alkaline fillers, such as calcium hydroxide, are used or even when alkalized suspensions are used, it is absolutely essential to use blowing agents. The blowing agents in question are inert liquids boiling at temperatures in the range from $-25°$ C to $+80°$ C. The blowing agents preferably have boiling points in the range from $-15°$ C to $+40°$ C. They are added in quantities of from 0 to 50% by weight and preferably in quantities of from 2 to 30% by weight, based on the reaction mixture.

Examples of suitable organic blowing agents include acetone; ethyl acetate; methanol; ethanol; halogen-substituted alkanes, such a methylene chloride, chloroform, ethylidene chloride, vinylidene chloride, monofluorotrichloromethane, chlorodifluoromethane and dichlorodifluoromethane; butane; hexane; heptane; diethyl ether; and the like. A blowing effect may also be obtained by adding compounds which decompose at temperatures above room temperature giving off gases such as nitrogen. Examples of compounds such as these are azo compounds, such as azoisobutyronitrile. Other examples of blowing agents and information on the use of blowing agents may be found in Kunststoff-Handbuch, Vol. VII, published by Vieweg and Hochtlen, Carl-Hanser-Verlag, Munich 1966, pages 108 and 109, 453 to 455 and 507 to 510.

However, it must be specifically emphasized that it is a particular advantage of the process according to the invention that blowing agents do not necessarily have to be used, because carbon dioxide is liberated in sufficient quantities to foam the primary emulsion during the reaction of the polyisocyanate with the aqueous filler suspension. This is also an advantage of the foams according to the invention over foams produced using alkali silicate solutions as reactive component, in which case the carbon dioxide is substantially quantitatively absorbed and acts as hardener for the silicate solution where, in terms of weight, more waterglass than polyisocyanate is used. As a result, the use of blowing agent in foams of this kind is absolutely essential.

By contrast, it is possible in principle in accordance with the present invention not to use expanding agents at all, or at least to use expanding agents in reduced quantities in relation to the prior art, which is an advantage both from an economical point of view and from an ecological point of view.

In order to bring these advantages fully to bear, basic fillers or alkaline additives are preferably not used at all or only in small quantities where they are required as catalysts or, for example, for correcting any primary shrinkage that may occur.

According to the invention, tertiary amines are used as catalysts. Examples of suitable tertiary amines include triethylamine, tributylamine, N-methyl morpholine, N-ethyl morpholine, N-cocomorpholine, N,N,N'-tetramethyl ethylene diamine, 1,4-diazabicyclo-(2,2,2)-octaine, N-methyl-N'-dimethyl aminoethyl piperazine, N,N-dimethyl benzyl amine, bis-(N,N-diethylaminoethyl)-adipate, N,N-diethylbenzyl amine, pentamethyl diethylene triamine, N,N-dimethyl cyclohexyl amine, N,N,N',N'-tetramethyl-1,3-butane diamine, N,N-dimethyl-$\beta$-phenyl ethylamine, 1,2-dimethyl imidazole 2-methyl imidazole, and the like.

It is particularly preferred to use tertiary amines containing isocyanate-reactive hydrogen atoms such as triethanolamine, triisopropanolamine, N-methyl diethanolamine, N-ethyl diethanolamine, N,N-dimethyl ethanolamine, and their reaction products with alkylene oxides, such as propylene oxide and/or ethylene oxide.

Other suitable tertiary amine catalysts are sila-amines having carbonsilicon bonds, of the type described, in German Pat. No. 1,229,290. Specific examples include 2,2,4-trimethyl-2-silamorpholine and 1,3-dimethylamino methyl tetramethyl disoloxane.

Other suitable additional catalysts are nitrogen-containing bases such as tetra-alkyl ammonium hydroxides, alkali hydroxides, such as sodium hydroxide, alkyl phenolates, such as sodium phenolate, or alkali alcoholates, such as sodium methylate. Hexahydrotriazines may also be used as catalysts.

According to the invention, organo metallic compounds, and more especially organo tin compounds, may also be used as additional catalysts.

Preferred organo tin compounds are tin(II) salts of carboxylic acids, such as tin(II) acetate, tin (II) octoate, tin(II) ethyl hexoate and tin(II) laurate, and the dialkyl tin salts of carboxylic acids such as dibutyl tin diacetate, dibutyl tin dilaurate, dibutyl tin maleate, dioctyl tin diacetate, and the like.

Further examples of catalysts suitable for use in accordance with the invention and information on the way in which the catalysts work may be found in Kunststoff-Handbuch, vol. VII, published by Vieweg and Hochtlen, Carl-Hanser-Verlag, Munich 1966, pages 96 to 102.

The catalysts are generally added in a quantity of from about 0.001 to 10% by weight, based on the quantity of polyisocyanates.

According to the invention it is also possible to use surface-active additives (emulsifiers and foam stabilizers). Suitable emulsifiers are, for example, the sodium salts of castor oil sulphonates or even of fatty acids, or salts of fatty acids with amines, such as diethylamine oleate or diethanolamine stearate. Alkali or ammonium salts of sulphonic acids, for example dodecyl benzene sulphonic acid or dinaphthyl methane disulphonic acid, or even of fatty acids, such as ricinoleic acid, or of polymeric fatty acids, may also be used as surface-active additives.

Foam stabilizers of the known polyether/polysiloxane type must also be used in the process according to the invention. This is surprising insofar as, according to German Offenlegungsschrift No. 2,319,706, stabilizers of this type are not necessary for the production of hydrophilic foams and, in many cases, an addition of silicon stabilizers during the foaming of ionic polyisocyanates with filler suspensions is even harmful and results in the loss of the favorable properties.

Standard commercial-grade compounds known per se are used as the silicone stabilizers. Typical examples of these polyether/polysiloxane type compounds are described in U.S. Pat. Nos. 2,834,748; 2,917,480, and 3,629,308, the disclosures of which are herein incorporated by reference. The polyether-polysiloxane foam stabilizers are generally added in a quantity of from about 0,05 to 5% by weight, based on the quantity of polyisocyanates.

According to the invention, it is also possible to use cell regulators such as paraffins or fatty alcohols or dimethyl polysiloxanes; pigments or dyes; flameproofing agents such as tris-chloroethyl phosphate or ammonium phosphate and polyphosphate; stabilizers against the effects of ageing and weathering; plasticizers; and, substances with fungistatic and bacteriostatic effects.

Further examples of the surface-active additives and foam stabilizers, cell regulators, reaction retarders, stabilizers, flameproofing substances, plasticizers, dyes, fillers, fungistatic and bacteriostatic agents optionally used in accordance with the invention, and information on the way in which additives of this kind are used and how they work may be found in Kunststoff-Handbuch, Vol. VII published by Vieweg and Hochtlen, Carl-Hanser-Verlag, Munich 1966, pages 103 to 113.

Of particular importance and, hence, preferred are additives which further reduce the inflammability of plastics of the type in question. In addition to the usual flameproofing agents, halogenated paraffins and inorganic salts of phosphoric acid, pyrophosphoric acid, metaphosphoric acid or polyphosphoric acid, are particularly suitable for this purpose, both water-soluble and also insoluble phosphates being usable.

Generally, the foams are produced in accordance with the invention by mixing the described reaction components with one another in one or several stages using a batch-type or continuous mixer, foaming the mixture formed and allowing it to harden, generally outside the mixer, in molds or on suitable substrates. The reaction temperature required, amounting to between about 0° C and 200° C and preferably to between 30° C and 160° C, may be reached either by preheating one or more reaction components before the actual mixing process, by heating the mixer itself or by heating the reaction mixture prepared after mixing. Combinations of these or other procedures may of course also be used for adjusting the reaction temperature. In most cases, sufficient heat is generated during the reaction itself, so that the reaction temperature can rise to levels above 30° C after the beginning of the reaction or after the beginning of foaming.

In many cases, machines are often used, for example those of the type described in U.S. Pat. No. 2,764,565. Information on processing machines of this type, which may also be used in accordance with the invention, may be found in Kunststoff-Handbuch, Vol. VII, published by Vieweg and Hochtlen, Carl-Hanser-Verlag, Munich 1966, pages 121 to 205.

Particularly high-quality plastics are obtained by the process according to the invention when hardening is carried out at temperatures above 20° C and more especially in the range from 30° to 100° C. So much heat is liberated, even in the absence of heat supplied from outside, especially when mixtures of polyisocyanates having 10 to 35% of NCO groups and strongly alkaline, amine-catalyzed suspensions are used, that there is no need for additional heat to be applied. Temperatures of up to 100° C can be reached inside foam blocks.

If the heat given off during the reaction between the components is not sufficient, mixing may readily be carried out at elevated temperature, for example at temperatures in the range from 40° C to 100° C. In special cases, mixing may even be carried out under pressure at temperatures above 100° C and up to about 150° C, so that when the material is discharged it is relieved of pressure and foams.

Relatively high-boiling blowing agents such as hexane, dichloroethane, trichloroethane, carbon tetrachloride, and light petrol, may of course also be used as additives in cases where foam production is carried out at elevated temperature. However, the water present in the mixture may also perform the function of a blowing agent, if the reaction temperature exceeds 100° C.

However, the foams may also be produced using inert gases, more especially air. For example, one of the two reaction components may be prefoamed with air and subsequently mixed with the others. The mixture of the components may also be prepared, for example by means of compressed air, resulting directly in the formation of a foam which subsequently hardens during shaping or forming.

For given recipes, the properties of the foams formed, for example their densities when moist, are governed to a certain extent by the parameters of the mixing process, for example the shape and rotational speed of the stirrer, the shape of the mixing chamber, and the like, and by the temperature selected for initiating the foaming reaction. It may vary between approximately 0.005 and 0.3 g/cc, although the moist, fresh foam is generally obtained with densities of from 0.01 to 0.2 g/cc. The dried foams may be closed-cell or open-cell foams. In general, they are substantially open-cell foams and have densities of from 0.005 to 0.25 g/cc, and preferably from 0.01 to 0.1 g/cc.

The behavior of the reaction mixtures provides the process according to the invention with numerous potential applications and, hence, fields of application of which a few are outlined by way of example in the following. The possibility of either leaving the water present in the hardened mixtures as a desirable constituent of the foam, of protecting the foam against the escape of water by suitable coating or lining, or of completely or partly eliminating the water by suitable drying techniques, for example heating cabinet, hot air, IR-heating, ultrasonics or high-frequency heating, may be selected according to the particular application envisaged.

The reaction mixture containing blowing agents may be, for example, coated on to warm, cold or even IR- or HF-irradiated substrates, or after passing through the mixer, may be sprayed with compressed air or even by the airless process onto those substrates where it can foam and harden to form a filling, insulating or damp-proofing coating. The foaming reaction mixture may even be molded, cast or injection-molded into cold or heated molds and left to harden in those molds (relief or solid or hollow molds) optionally by centrifugal casting either at room temperature or at temperatures of up to 200° C, and optionally under pressure. In this case, it is possible to use reinforcing elements in the form of inorganic and/or organic or metallic wires, fibers, nonwovens, foams, woven fabrics, skeletons, and the like. This may be done, for example, by the fiber-mat impregnating process or by processes in which reaction mixtures and reinforcing fibers are simultaneously applied to the mold, by means of a spray. The moldings obtainable in this way may be used as structural components, for example in the form of optionally foamed sandwich moldings produced directly or subsequently by lamination with metal, glass, plastics, and the like. The low inflammability in wet or dry form is an advantage in this respect. However, they may also be used as hollow bodies, for example as containers for goods to be kept moist or cool, as filter materials or exchangers, as catalyst or active-material supports, as decorative elements, parts of furniture and cavity fillings. They may also be used as heavy-duty lubricants and coolants or as supports therefor, for example in the extrusion of metals. They may also be used in the field of model building and mold construction and in the manufacture of molds for casting metals.

In one preferred procedure, foaming is carried out at the same time as hardening, for example by preparing the reaction mixture in a mixing chamber and simultaneously adding the readily volatile blowing agent such as dichlorodifluoromethane, trichlorofluoromethane, butane, isobutylene or vinyl chloride, so that, providing the temperature of the mixture is suitably selected, the reaction mixture leaving the mixing chamber simultaneously foams through evaporation of the blowing agent and hardens under the effect of the activator, the foam formed being fixed. In addition, the initially thinly liquid reaction mixture may be blown into a foam by introducing gases, optionally under pressure, such as air, methane, $CF_4$ and noble gases, the resulting foam being brought into the required form and hardened. Similarly, it is also possible to initially convert the filler suspension or polyisocyanate solution, optionally containing foam stabilizers such as wetting agents, foam formers, emulsifiers and other organic or inorganic fillers or diluents, into a foam by gassing, and to mix this foam with the other component and, optionally, with the activator in a mixer, followed by hardening.

In one preferred procedure, a solution of the polyisocyanate in liquid blowing agent is mixed with the aqueous filler suspension and the resulting mixture is hardened while foaming.

The foams obtainable in this way may be used in dry or wet form, optionally after a compacting or tempering process, optionally carried out under pressure, as insulating materials, cavity fillings, packaging materials, building materials with a high resistance to solvents and a high degree of non-inflammability. They may also be used as lightweight building elements in the form of sandwiches, for example with metal covering layers, in house construction vehicle construction and aircraft construction.

The lightweight, inorganic-organic foams obtainable by the process according to the invention with gross densities of from 10 to 100 kg/m$^3$ are of particular interest.

The inorganic-aqueous component is used in a weight excess in order to obtain favorable burning properties. Blowing agents, for example air, halogenated hydrocarbons or gas-liberating substances, for example $H_2O_2$, are generally used in order to obtain the low gross densities required.

In the presence of catalysts and stabilisers, it is thus possible to produce inorganic-organic foams, which are of particular interest as lightweight insulating materials for the building sector by virtue of their economy, their low inflammability and their favorable heat-insulating properties, using foaming machines of the kind commonly used in polyurethane technology, for example by the high-pressure reciprocating-pump delivery technique and mixing on the counter-injection principle in a mixing chamber, or by the low-pressure gear-pump delivery technique and stirrer mixing.

The favorable burning properties may be further improved by the addition of flameproofing agents, but more especially by using inorganic-aqueous salt solutions or suspensions of, for example, alkali, ammonium or alkaline-earth phosphates, urea solutions, phosphoric acid, and the like.

Foams of this kind may be produced in the form of continuous or individual blocks by the laminator technique, in the form of laminated or non-laminated sheet products, or even in situ by means of any one of the known mixing techniques.

Particularly high-quality lightweight building materials for the structural branch of the building sector may be produced by filling packings of inorganic granulates of low gross density, such as for example expanded glass, expanded clay, expanded shale, pummice, and the like, with the abovementioned lightweight foams.

The inorganic properties are particularly important so far as the burning properties are concerned, whereas the properties of the organic isocyanate-based foams are particularly important in regard to simple technology, favorable heat insulation and the possibility of directly foaming covering layers in a single production stage.

Wall and facing elements may be easily produced in this way and, by virtue of the small quantity of organic constituents in the composite material as a whole, satisfy the requirements of the fire class of non-inflammable building materials (A2) according to DIN 4102.

Hard foams are preferably produced by the process according to the invention. To achieve this, polyisocyanates containing less than 30% and, more especially, less than 10% of polyols, polyester polyols or polyether polyols, are foamed. Polyisocyanates of this kind preferably have an NCO-content of from 20 to 32% by weight.

However, it is also possible, although less preferred, to produce semi-hard and soft hydrophobic foams of the type used, for example as shock-absorbing padding materials for safety components in motor-vehicle construction, as packaging foams, and the like. Polyisocyanates modified with polyethers or polyesters or even mixtures of polyisocyanates with the usual polyesters and/or polyether diols, are used for this purpose. In these cases, it is important to ensure that any content of hydrophilic ether sequences [for example -(CH$_2$—CH$_2$— O)$_x$—], amounts to no more than 20% and preferably to no more than 10% of the total quantity of polyether or polyester.

In any event, it is important to ensure that the polyisocyanate or the preadduct of polyisocyanate with polyester or polyether is insoluble in water, forms a two-phase emulsion when mixed with water and hardens into a hydrophobic foam.

In the context of the invention, a hydrophobic foam obtained by the process according to the invention is a foam which undergoes linear swelling of at most 5% when stored under water for 24 hours. The linear expansion of the foam preferably amounts to less than 2% after 24 hours' storage in water.

The reaction mixtures may also be dispersed in droplet form, for example in petrol, or may be foamed and hardened in free fall or the like, resulting in the formation of foam beads.

It is also possible to incorporate in the foaming reaction mixtures, providing they are still fluid, organic and/or inorganic foamable or already foamed particles, such as expanded clay; expanded glass; wood; popcorn; cork; hollow beads of plastics such as vinyl chloride polymers, polyethylene, styrene polymers or foam particles thereof; and foam particles of, polysulphone, polyepoxide, polyurethane, ureaformaldehyde, phenolformaldehyde, polyimide polymers. It is also possible to allow the reaction mixtures to foam through packings of these particles and, in this way, to produce insulating materials which are distinguished by favorable burning properties.

The foam-forming mixture may also be used for foaming-through nonwovens, woven fabrics, lattices, structural elements or other permeable structures (such as foam), so that it is possible in this way to obtain composite foams with special properties, for example favorable burning properties, which may optionally be directly used as structural components in the building, furniture or vehicle and aircraft sectors.

The foams according to the invention optionally enriched with fertilisers and plant-protection agents, may be added to soil in particular form in order to improve the agrarian consistency of soil. Foams of high water content may be used as substrates for propagating seedlings, cuttings and plants or cut flowers. By spraying the mixtures onto impassable or excessively loose ground, as encountered for example in sand dunes or marshes, it is possible to obtain a high degree of solidification which is passable after only a short time and affords protection against erosion.

It is also of advantage to spray the proposed reaction mixtures onto an object to be protected in the event of fire or accidents. The water present in the reaction mixtures does not run down the surface of the object to be protected, nor does it evaporate prematurely, so that particularly effective protection against fire or heat and radiation is obtained, because the hardened mixture, providing it still contains water, cannot be heated significantly above 100° C and absorbs IR or nuclear radiation.

By virtue of their sprayability, the mixtures can form effective protective walls and protective layers in mining in the event of accidents or even during routine work, for example by being sprayed onto woven fabrics, other surfaces, lattices or even directly onto walls. One factor of particular importance in this respect is that hardening is obtained after only a short time.

The foaming mixtures may also be used in building construction, construction engineering and road building for the erection of walls, igloos, seals, for filling gaps, for plastering, priming, insulation, decoration and as coating, topping and covering materials. They may also be used as adhesives or mortars or as casting compositions, optionally in filled form, for which purpose inorganic or organic fillers may be used.

Since the hardened foams obtained by the process according to the invention can show considerable porosity after drying, they are suitable for use as drying agents because they are able to absorb water. However, they may also be charged with active substrates or used as catalyst supports or as filters and absorbents.

Additives optionally used or subsequently incorporated in the reaction mixture, such as emulsifiers, detergent ingredients, dispersants, wetting agents, perfumes, hydrophobising substances, enable the property spectrum of the foams in wet or dry form to be modified as required.

On the other hand, the foams may be subsequently lacquered, metallised, coated, laminated, electroplated, vapor-coated, bonded or flocked in wet, dry or impregnated form. The moldings may be further processed in wet or dry form, for example by sawing, milling, drilling, planning, polishing and the like.

The properties of the filled moldings may be further modified by thermal after-treatment, oxidation processes, hot-pressing, sintering processes or surface melting or other compacting processes.

The foams obtainable in accordance with the invention may be surface-dried or, in the case of substantially permeable structures, for example relatively high-grade open-cell foams or porous materials, may even be dried by centrifuging, vacuum treatment, by blowing through air or by purging with (optionally heated) liquids or gases which remove the water present, such as methanol, ethanol, acetone, dioxane, benzene, chloroform and the like, or air, $CO_2$ and superheated steam. The wet or dry moldings may also be similarly aftertreated by rinsing or impregnation with aqueous or non-aqueous acid, neutral or basic liquids or gases, for example hydrochloric acid, phosphoric acid, formic acid, acetic acid, ammonia, amines, organic or inorganic salt solutions, lacquer solutions, solutions of polymerisable or already polymerised monomers, dye solutions, electroplating baths, solutions of catalysts or catalyst precursors, and odorants.

The new composite foams are also suitable for use as structural materials providing they have densities of from about 50 to 900 g/L, because they are resistant to tensile and compressive stressing and are tough and stiff. At the same time, they are elastic and show high permanent dimensional stability under heat coupled with a high degree of non-inflammability.

In addition, foams of this kind also show outstanding heat-insulating and sound-absorbing properties which, in conjunction with their outstanding resistance to fire and heat, opens up potential applications in the insulation sector. For example, it is possible to produce high-quality light-weight structural panels either by cutting or sawing continuously foamed blocks into corresponding panels or by foaming panels of this kind and, in particular, complicated moldings in molds, optionally under pressure. Moldings with an impervious outer skin can also be produced by suitable processes.

In particular, however, the process according to the invention is suitable for in situ foaming. Thus, any hollow molds, of the type formed by the conventional method of formwork, may be cast or filled with the foam herein.

Cavities, joints and cracks may readily be filled with the reaction mixture, resulting in a very firm bond between the joined materials. Insulating internal plasters may also be produced simply by spraying on the reaction mixture.

In many cases, the materials obtained may be used instead of wood or hardboard. They can be sawed, rubbed, planed, nailed, drilled, milled and may thus be machined and used in numerous different ways.

Highly brittle lightweight foams which may be obtained, for example, with extremely high filler contents may readily be converted by crushing in suitable machines into dust-fine powders which may be used for numerous purposes as polyurea-modified fillers. The organic modification provides for favorable surface interaction with polymers and, in some cases, also for a certain degree of surface thermoplasticity which enables high-quality molding compounds to be produced, the addition of crosslinkers enabling topochemical surface reactions to be carried out.

For numerous applications, additional fillers in the form of inert particulate or powder-form materials are additionally incorporated in the mixtures of polyisocyanates and finely divided filler suspensions.

Suitable fillers include solid inert inorganic or organic substances which may be used, for example, in the form of powders, granulates, wires, fibers, dumb-bells, crystallites, spirals, rodlets, beads, hollow beads, foam particles, nonwovens, woven fabrics, knitted fabrics, ribbons, film fragments and the like. Examples include dolomite, chalk, alumina, asbestos, basically adjusted silicas, sand, talcum, iron oxide, aluminum oxide, and oxide hydrates, alkali silicates, zeolites, mixed silicates, calcium silicates, calcium sulphates, alumosilicates, basalt wool or powder, glass fibers, carbon fibers, graphite, carbon black, Al-, Fe-, Cu-, Ag-powder, molybdenum sulphide, steel wool, bronze or copper gauze, silicon powder, expanded clay particles, hollow glass beads, glass powder, lava and pummice particles, sawdust, wood chips, cork, cotton, straw, popcorn, coke, particles of filled or unfilled; foamed or unfoamed, stretched or unstretched organic polymers. Of the large number of organic polymers which may be used, a few are mentioned by way of example in the following and may be used, for example in the form of powders, granulates, foam particles, beads, hollow beads, foamable or unfoamed particles, fibers, ribbons, woven fabrics, nonwovens and the like: polystyrene, polyethylene, polypropylene, polyacrylonitrile, polybutadiene, polyisoprene, polytetrafluoroethylene, aliphatic and aromatic polyesters, melamine-urea or phenolic resins, polyacetal resins, polyepoxides, polyhydantoins, polyureas, polyethers, polyurethanes, polyimides, polyamides, polysulphones, polycarbonates, and, of course, any other copolymers and also plastics and rubber waste.

In one particularly preferred embodiment of the process according to the invention, finely divided fillers such as lime, cement, anhydrite, chalk, and clay are added not only to the aqueous phase but also to the polyisocyanate, in order in this way to enrich the foam as far as possible with inorganic fillers. Stabilised polyisocyanate-filler suspensions may also be used. If the emulsion suspension obtained by mixing the polyisocyanate suspension with the aqueous suspension is subsequently used for filling with foam packings of coarsely disperse inorganic materials such as, for example, expanded clay, expanded glass, expanded shale, gravel, chippings, broken glass or bricks, building materials having an extremely low thermal value and, hence, excellent burning properties and more especially a high fire resistance time, are obtained in simple manner without any appreciable consumption of energy and, in particular, without any need for reheating. The major advantage of the process according to the invention is that valuable foam materials distinguished by their low thermal value and excellent fire resistance time can be obtained from inorganic starting materials available in abundance by suitable reaction with polyisocyanates, as described in detail above, in accordance with a simple energy-saving technology.

EXAMPLES

Starting materials (A) Polyisocyanates

A 1: Diisocyanatodiphenyl methane is distilled off from the crude phosgenation product of an aniline-formaldehyde condensate until the distillation residue has a viscosity of 200 cP at 25° C. (2-nuclear content: 4.43% by weight; 3-nuclear content: 23.5% by weight; content of more highly nuclear polyisocyanates: 32.2% by weight; NCO-content: 31.4% by weight).

A 2: Similarly produced polyisocyanate having a viscosity of 400 cP at 25° C (2-nuclear content: 45.1% by weight; 3-nuclear content: 23.3% by weight; content of more highly nuclear polyisocyanates: 32.6% by weight; NCO-content: 31.0% by weight).

A 3: Similarly produced polyisocyanate having a viscosity of 1700 cP at 25° C (2-nuclear content: 40.3% by weight; 3-nuclear content: 34.0% by weight; content of more highly nuclear polyisocyanates: 25.7% by weight, NCO-content: 30.4% by weight).

A 4: 120 g of diethylene glycol are added dropwise over a period of 30 minutes with stirring at room temperature to 4500 g polyisocyanate A 2. The reaction mixture underwent an increase in temperature to 35° C. Stirring for 8 hours at room temperature gave the polyisocyanate semi-prepolymer A 4, NCO-content: 27.3% by weight, viscosity: 6000 cP at 25° C.

A 5: 3000 g of polyisocyanate A 2 were reacted for 2 hours at 60° C with 90 g of glycerol. The polyisocyanate semiprepolymer A 5 was obtained, NCO-content: 26.6% by weight, viscosity: 12,000 cP at 25° C.

A 6: 10 kg of polyisocyanate A 2 were introduced under nitrogen into a stirrer-equipped apparatus. 10 g of propylene oxide were added dropwise at room temperature, followed by stirring for 1 hours. Excess propylene oxide was then removed at 40° C by passing over nitrogen. 2 kg of an n-butanol-started polyethylene oxide monoalcohol with an average molecular weight of 1145, 2.4 g of Znacetyl acetonate and 4.8 g of p-toluene sulphonic acid methyl ester were then added, followed by stirring for 3 hours at 100° C. 5 g of benzoyl chloride were then added to block the catalyst, followed after cooling to room temperature by determination of the viscosity and NCO-content of the resulting allophanate-group-containing polyisocyanate semi-prepolymer A 6, NCO-content: 24% by weight, viscosity: 745 cP at 25° C.

(B) Suspensions

B 1: 2400 g of a chalk (specific gravity 2.8; apparent density 920 g/l, particle size: 50% < 10 $\mu$, Ulmer Weiss "Jurastern", a product of Montenovo-Werke), 960 g of water and 640 g of a 50% aqueous sodium hexametaphosphate solution, were intensively mixed together. The resulting suspension was adjusted to pH 12.4 with 91 g of a 50% potassium hydroxide solution. Solids content: 67.6% by weight.

B 2: 2760 g of a chalk corresponding to B 1 were suspended with intensive stirring in 1300 g of water, after which 20 g of a 50% potassium hydroxide solution were stirred in: pH 12.6, solids content: 68.1% by weight.

B 3: 200 g of a chalk (specific gravity: 2.7; apparent density: 445 g/l; particle size: average statistical particle diameter approx. 1 $\mu$, 70 – 80% of the particles < 2 $\mu$, Omyalite S, a product of Omya GmbH), were suspended in 275 g of water and the mixture was subsequently adjusted to pH 12.9 with 7 g of 50% potassium hydroxide solution. Solids content: 42.2% by weight.

B 4: 600 g of a chalk corresponding to B 3 were mixed with 640 g of water, 160 g of a 50% aqueous sodium hexametaphosphate solution and 30 g of 50% potassium hydroxide solution. pH: 12.6, solids content: 48.6% by weight.

B 5: 400 g of white hydrate of lime (particle size: 80% < 30 $\mu$, white hydrate of lime manufactured by Messrs. Arminia-Hydroka) were suspension in 400 g of a 0.5% aqueous solution of a high molecular weight (molecular weight about 80000) disodium salt of a maleic acid/ethylene copolymer, followed by the addition of 0.5 g of the Na-salt of a sulpho-chlorinated $C_{10}$ – $C_{14}$ - paraffin mixture. The pH-value of the mixture was then adjusted to pH 12.4 with 50% KOH, followed by dilution with 150 g of water. Solids content: 42.5% by weight.

B 6: A suspension was prepared from 400 g of white hydrate of lime corresponding to B 5, 400 g of water and 6.4 g of a sodium salt of a polycarboxylic acid (Polysalz CA, a product of BASF) [molecular weight about 1000], followed by adjustment to pH 12.4 with 50% potassium hydroxide solution. Solids content: 50.3% by weight.

B 7: 400 g of kaolin (China clay SBS, particle size: 90%, < 2 $\mu$, a product of Messrs. Bassermann & Grolmann) were introduced into a stirred solution of 1.6 g of sodium polyphosphate (Calgon PTH, a product of Benckiser-Knapsack GmbH) and 5.5 g of a 50% potassium hydroxide solution in 400 g of water. The resulting suspension had a pH-value of 12.1 and a solids content of 50% by weight.

B 8: 400 g of chalk (Sokal P 2, particle size: 80% < 2 $\mu$, a product of Deutsche Solvay AG) were stirred into a solution of 3.2 g of Polysalz CA in 400 g of water. The suspension formed was adjusted to pH 12.1 with 2.5 g of a 50% potassium hydroxide solution, and had a solids content of 50% by weight.

B 9: 400 g of barium sulphate (Blanc fixe, particle size: 80% < 2 $\mu$, a product of Messrs. Bassermann & Grolmann) were stirred into a solution of 1.6 g of Calgon PTH in 400 g of water, and the suspension formed adjusted to pH 12.5 with 5 g of 50% potassium hydroxide solution. Solids content: 50.1% by weight.

B 10: An iron oxide yellow suspension (Eisenoxidgelb 1420; particle size: 90% < 1 $\mu$, a product of Bayer AG) was prepared using 0.3% by weight of polysalz CA based on the solids content. Solids content: 60.5% by weight, pH: 9.8.

B 11: Titanium dioxide (Bayertitan R-KB-3, particle size: 90% < 1 $\mu$, a product of Bayer AG) was suspended in water using 0.4% by weight, based on solids, of Polysalz CA Solids content: 75% by weight, pH: 9.0.

B 12: 400 g of chalk corresponding to B 8 were mixed with 400 g of water and 3.2 g of Polysalz CA. Solids content: 50.2% by weight, pH: 10.0.

B 13: 75 g of chalk corresponding to B 8 were suspended in 75 g of water and the suspension formed adjusted to pH 12.9 with 3.2 g of 50% KOH. Solids content: 51% by weight.

B 14: 75 g of chalk corresponding to B 8 were suspended in 75 g of water. Solids content: 50% by weight, pH: 9.0.

B 15: A suspension with a solids content of 70% by weight and a pH-value of 9.8 was prepared from 105 g of chalk corresponding to B 8, 45 g of water and 0.5 g of Polysalz CA.

B 16: 600 g of magnesium aluminum silicate (Fullstoff E 40, particle size: 80% < 1 μ, a product of Bayer AG) were stirred into 400 g of water containing 3.2 g of Polysalz CA. The suspension had a solids content of 60% by weight and a pH-value of 9.5.

B 17: A suspension was prepared from 600 g of chalk corresponding to B 8, 400 g of water and 3.2 g of Polysalz CA. Solids content: 60% by weight, pH: 10.0.

(C) Auxiliaries

C 1: Stabilisers (polyether polysiloxane L 5340, a product of Union Carbide Corp.)

C 2: Blowing agent: trichlorofluoromethane

C 3: Catalyst (consisting of 75% by weight of N,N-dimethylaminoethanol and 25% by weight of diazabicyclooctane)

C 4: Catalyst: N,N-dimethyl benzylamine

C 5: Water

C 6: Catalyst: di-o-butyl tin dilaurate

C 7: Emulsifier: 44% aqueous sodium silicate solution (molar ratio $Na_2O$: $SiO_2$=1:2), a product of the Henkel company C 8: 50% aqueous potassium hydroxide.

EXAMPLES 1 to 14 (Variation of the polyisocyanates)

The examples are summarised in Table 1.

The quantitative ratios of polyisocyanate to aqueous suspensions are kept constant at 1:1, whilst the type of polyisocyanates and, in a few Examples, the quantity of the auxiliaries used were varied.

In a cardboard beaker, stabiliser (L 5340) and, optionally, trichlorofluoromethane to act as a blowing agent were added to the particular polyisocyanate or polyisocyanate mixture used. A likewise premixed composition of suspension, catalyst and, optionally, water was added to the resulting mixture, followed by intensive mixing, generally for 15 seconds, by means of a Pendraulik Laboratory mixer model LM 34 (manufactured by Pendraulik Maschinen und Apparate GmbH), after which the foam mixture was poured into a paper packet where it hardened while foaming. The quantities are expressed in g and the times in seconds:

$t_R$ = stirring time, mixing time of the mixture of component I and component II $t_L$ = Latent time, period of time elapsing from the beginning of mixing to the beginning of foaming.

$t_S$ = rise time, period of time elapsing from the beginning of mixing to the end of foaming.

In each case, density and compressive strength were measured 10 days after production.

Examples 1 to 14 show that, using substantially the same recipe, in which the same inorganic chalk suspension B 1 is always used, polyisocyanates A 2 - A 6, which have a viscosity of from 400 to 12,000 cP at 25° C, are very suitable. If, by contrast, the low-viscosity polyisocyanate A 1 is used on its own, the foam mixture collapses (Examples 8, 9, 12). Polyisocyanates A 2 and A 3 which, although identical in chemical structure, have a higher viscosity give useful foams (Examples 6, 10, 11, 13). In the production of the foams, it is important to ensure that the foamable mixture is neither too thinly liquid nor too viscous. Phase separation tends to occur in mixtures which are too thinly liquid, whereas in the case of excessively viscous mixtures base faults are readily produced in the finished foam. Despite the same activation, the polyether-modified polyisocyanate A 6 shows considerably shorter reaction times than the other polyisocyanates which would appear to be attributable to the greater hydrophilicity of A 6. In general, the foams show a brittle skin or surface immediately after production, although it becomes tough and strong after a few days. Similarly, although the foams lose weight when stored at room temperature, they gain in strength and toughness.

EXAMPLES 15 to 40 (Variation of the suspensions)

The Examples are summarized in Table 2. The quantitative ratios of polyisocyanate to aqueous suspension are kept constant at 1:1 in the same way as in Examples 1 to 14. Polyisocyanate A 4 in admixture with A 1 or A 3 was used as the polyisocyanate. By contrast, a variety of different suspensions B 2 to B 16 were used and the quantity of auxiliaries (activator, blowing agent, potassium hydroxide solution, etc.) was varied. The production conditions and also the abbreviations used correspond to those of Examples 1 to 14.

The lightweight, tough inorganic-organic foams obtainable in this way generally have a regular, fine cell structure, but occasionally show base faults which are presumably attributable to the procedure adopted and to the consistency of the foamable mixture. In each case, unit weight and compressive strength were measured some 10 days after production.

These tests show that a wide range of different chemical compounds may also be used for the preparation of suitable suspensions providing their particle size meets the requirements according to the invention.

It is also apparent from the Examples that the presence of a suspension-stabilizing agent, such as sodium polyphosphate for example, although not absolutely essential, is nevertheless desirable in regard to the solids concentration and the viscosity of the suspension.

In cases where potassium hydroxide is not additionally used, the activator content has to be considerably increased (Example 34). Although the short reaction times required for foaming can also be obtained by using potassium hydroxide on its own and dispensing with amine catalysts (Examples 28 to 32), the properties of the foam obtained are poor. Coarse irregular cells with a density coupled with a friable, sandy consistency with low compressive strengths make the product unsuitable for commercial application. In the complete absence of basic compounds, i.e. both potassium hydroxide and amine catalysts, it is not possible to obtain reaction times suitable for foaming (Examples 26, 27).

Organometallic catalysts (introduced by way of the polyisocyanate component) result in disintegration phenomena in the foamable reaction mixture and give extremely brittle foams with hardly any compressive strength (Examples 37, 38).

Useful inorganic-organic foams can also be produced without additional blowing agents, the carbon dioxide formed during the isocyanate-water reaction taking over this function (Examples 35, 36).

EXAMPLES 41-45

These Examples are summarized in Table 3. Whereas in the preceding Examples (1-40) the ratio of polyisocyanate to suspension was kept constant, in these Examples the quantitative ratios are varied, polyisocyanate A 4 being used as the polyisocyanate component and suspension B 17 as the suspension.

A stabilizer (C 1), an activator combination (C 3 and C 4) and trichlorofluoromethane (C 2) acting as a blowing agent are used as auxiliaries. The stabilizer and blowing agent are added to the organic component, whilst the activator is added to the suspension.

The production conditions and also the abbreviations used correspond to those of Examples 1 to 14.

Tough inorganic-organic foams are obtained. These foams develop less heat during foaming with increasing suspension content, show higher gross densities and have improved fire-resistant properties.

For reasons of inflammability and economy, a weight ratio of polyisocyanate to suspension of greater than 2:1 is not advisable. By contrast, with a ratio of less than 1:6, it is difficult to obtain the heat of reaction required for problem-free foaming, in addition to which disintegration phenomena readily occur and the unit weights are extremely high.

Table 1

| Example No. | Polyisocyanates | | | | | | Suspension | Auxiliaries | | | | | Reaction times | | |
|---|---|---|---|---|---|---|---|---|---|---|---|---|---|---|---|
| | A 1 | A 2 | A 3 | A 4 | A 5 | A 6 | B 1 | C 1 | C 2 | C 3 | C 4 | C 5 | $t_R$ | $t_L$ | $t_S$ |
| 1 | 20 | — | — | 130 | — | — | 150 | 1 | 20 | 2 | 2 | 3 | 15 | 60 | 190 |
| 2 | — | — | — | 150 | — | — | 150 | 1 | 20 | 4 | 2 | 8 | 15 | 50 | 150 |
| 3 | — | — | — | 100 | — | 50 | 150 | 1 | 20 | 4 | 2 | 10 | 15 | 30 | 110 |
| 4 | — | — | — | — | — | 150 | 150 | 1 | 20 | 4 | 2 | 10 | 10 | 17 | 60 |
| 5 | — | — | 75 | — | — | 75 | 150 | 1 | 20 | 4 | 2 | 10 | 10 | 20 | 100 |
| 6 | — | — | 150 | — | — | — | 150 | 1 | 20 | 4 | 2 | 10 | 15 | 55 | 85 |
| 7 | — | — | — | — | 150 | — | 150 | 1 | 20 | 4 | 2 | 10 | 15 | 40 | 116 |
| 8 | 150 | — | — | — | — | — | 150 | 1 | 20 | 4 | 2 | 10 | 15 | 45 | — |
| 9 | 150 | — | — | — | — | — | 150 | 1 | 5 | 4 | 2 | 10 | 15 | 48 | — |
| 10 | — | 150 | — | — | — | — | 150 | 1 | 20 | 4 | 2 | 10 | 15 | 55 | 145 |
| 11 | — | 150 | — | — | — | — | 150 | 1 | 5 | 4 | 2 | 10 | 15 | 50 | 120 |
| 12 | 150 | — | — | — | — | — | 150 | 1 | — | 4 | 2 | 10 | 15 | 55 | — |
| 13 | — | 150 | — | — | — | — | 150 | 1 | — | 4 | 2 | 10 | 15 | 35 | 105 |
| 14 | — | 20 | — | 130 | — | — | 150 | 1 | 20 | 4 | 2 | 10 | 15 | 35 | 150 |

| Example No. | Assessment of the foam | Density kg/m³ | Compressive strength kp/cm² |
|---|---|---|---|
| 1 | fine cells, regular, tough, hardly any base faults | 22 | 0.3 |
| 2 | fine cells, regular, tough, base faults | 21 | 0.3 |
| 3 | fine cells, regular, tough, no base faults | 18 | 0.3 |
| 4 | coarse cells, irregular, tough, base faults | 14 | 0.12 |
| 5 | average cell size, regular, tough, some base faults | 17 | 0.2 |
| 6 | fine cells, slightly irregular, tough, numerous base faults | 23 | 0.3 |
| 7 | fine cells, regular, tough, numerous base faults | 29 | 0.4 |
| 8 | collapse (control test) | | |
| 9 | collapse (control test) | | |
| 10 | fine cells, slightly irregular, tough, numerous base faults | 20 | 0.3 |
| 11 | fine cells, slightly irregular, tough, numerous base faults | 20 | 0.3 |
| 12 | collapse (control test) | | |
| 13 | fine cells, slightly irregular, tough, numerous base faults | 22 | 0.4 |
| 14 | fine cells, regular, tough, hardly any base faults | 21 | 0.4 |

Table 2

| Example No. | Polyisocyanates | | | Auxiliaries | | Suspension | | Auxiliaries | | | | | | Reaction times | | |
|---|---|---|---|---|---|---|---|---|---|---|---|---|---|---|---|---|
| | A 1 | A 3 | A 4 | C 1 | C 2 | quantity | type | C 3 | C 4 | C 5 | C 6 | C 7 | C 8 | $t_R$ | $t_L$ | $t_S$ |
| 15 | 20 | — | 130 | 1 | 20 | 150 | B 2 | 2 | 2 | 3 | — | — | — | 15 | 60 | 195 |
| 16 | 20 | — | 130 | 1 | 20 | 150 | B 4 | 2 | 2 | 3 | — | — | — | 15 | 70 | 210 |
| 17 | 20 | — | 130 | 1 | 20 | 150 | B 6 | 2 | 2 | 3 | — | — | — | 15 | 90 | 170 |
| 18 | 20 | — | 130 | 1 | 20 | 150 | B 5 | 2 | 2 | 3 | — | — | — | 15 | 105 | 150 |
| 19 | 50 | — | 100 | 1 | 30 | 150 | B 7 | 4 | 4 | — | — | — | — | 15 | 30 | 130 |
| 20 | 50 | — | 100 | 1 | 30 | 150 | B 8 | 4 | 4 | — | — | — | — | 15 | 40 | 120 |
| 21 | 50 | — | 100 | 1 | 20 | 150 | B 9 | 4 | 4 | — | — | — | — | 20 | 40 | 155 |
| 22 | 50 | — | 100 | 1 | 15 | 150 | B10 | 4 | 4 | — | — | — | — | 15 | 33 | 150 |
| 23 | 50 | — | 100 | 1 | 15 | 150 | B11 | 4 | 4 | — | — | — | 7.2 | 15 | 16 | 40 |
| 24 | — | 150 | — | 1 | 10 | 150 | B 8 | 4 | 4 | — | — | — | — | 15 | 40 | 145 |
| 25 | — | 150 | — | 1 | 10 | 150 | B12 | 4 | 4 | — | — | — | — | 15 | 34 | 150 |
| 26 | — | 150 | — | 1 | 10 | 150 | B12 | — | — | — | — | — | — | 15 | — | — |
| 27 | — | 150 | — | 1 | 10 | 150 | B 8 | — | — | — | — | — | — | 15 | — | — |
| 28 | — | 150 | — | 1 | 10 | 150 | B12 | — | — | — | — | — | 8 | 15 | — | — |
| 29 | — | 150 | — | 1 | 10 | 150 | B12 | — | — | — | — | — | 16 | 15 | — | — |
| 30 | — | 150 | — | 1 | 10 | 150 | B12 | — | — | — | — | — | 24 | 15 | 30 | 145 |
| 31 | — | 150 | — | 1 | 10 | 150 | B12 | — | — | — | — | — | 40 | 15 | 16 | 20 |
| 32 | — | 150 | — | 1 | 10 | 150 | B12 | — | — | — | — | 48 | 10 | 11 | — | — |
| 33 | 20 | — | 130 | 1 | 25 | 150 | B13 | 4 | 4 | — | — | — | 1.6 | 15 | 35 | 160 |
| 34 | 20 | — | 130 | 1 | 25 | 150 | B14 | 6 | 6 | — | — | — | — | 10 | 16 | 65 |
| 35 | — | — | 130 | 1 | — | 150 | B15 | 4 | 4 | — | — | — | 2.4 | 10 | 16 | 35 |
| 36 | 20 | — | 130 | 1 | — | 150 | B15 | 3 | 3 | — | — | — | — | 10 | 17 | 50 |
| 37[1] | 20 | — | 130 | 1 | 10 | 150 | B15 | — | — | — | 3 | — | — | 15 | 66 | 240 |
| 38[1] | 20 | — | 130 | 1 | 10 | 150 | B15 | — | — | — | 6 | — | — | 15 | 50 | 180 |
| 39 | 20 | — | 130 | 1 | 10 | 150 | B16 | 4 | 4 | — | — | — | — | 15 | 27 | 150 |
| 40 | 20 | — | 130 | 1 | 20 | 150 | B16 | 3 | 3 | — | — | 5 | — | 15 | 35 | 125 |

| Example No. | Assessment of the foam | Density kg/m³ | Compressive strength kp/cm² |
|---|---|---|---|
| 15 | fine cells, regular, tough | 21 | 0.2 |
| 16 | fine cells, slightly irregular, tough | 21 | 0.4 |
| 17 | fine cells, slightly irregular, tough | 21 | 0.3 |

Table 2-continued

| | | | | |
|---|---|---|---|---|
| 18 | fine cells, slightly irregular, tough | | 23 | 0.11 |
| 19 | fine cells, regular, tough | | 18 | 0.2 |
| 20 | fine cells, regular, tough | | 19 | 0.2 |
| 21 | fine cells, regular, tough | | 19 | 0.2 |
| 22 | fine cells, regular, tough | | 19 | 0.2 |
| 23 | fine cells, irregular, tough | | 18 | 0.09 |
| 24 | fine cells, regular, tough | | 23 | 0.4 |
| 25 | fine cells, regular tough | | 22 | 0.4 |
| 26 | does not foam, disintegrates | | | |
| 27 | does not foam, disintegrates | | | |
| 28 | does not foam, brittle and disintegrated mass after hardening | | | |
| 29 | does not foam, brittle mass after hardening | control tests | | |
| 30 | minimal foaming, friable, sandy, irregular | | | |
| 31 | partial collapse, friable, sandy, irregular | | | |
| 32 | collapse, friable, sandy, irregular | | | |
| 33 | average cell size, irregular, tough, partly disintegrated | | 19 | 0.2 |
| 34 | fine cells, slightly irregular, tough | | 18 | 0.2 |
| 35 | fine cells, slightly irregular, tough | | 27 | 0.3 |
| 36 | fine cells, regular, tough | | 21 | 0.3 |
| 37 | coarse cells, friable, sandy, disintegrates | control tests | | |
| 38 | partial collapse, brittle, heavily distorted, disintegrates | | | |
| 39 | fine cells, regular, tough | | 20 | 0.3 |
| 40 | fine cells, regular, tough | | 20 | 0.3 |

[1]In these Examples, the activator was added to the polyisocyanate immediately before foaming

TABLE 3

| Example No. | Polyisocyanate A 4 | Auxilianes C 1 | Auxilianes C 2 | Suspension B 17 | Activators C 3 | Activators C 4 | Reaction time $t_R$ | Reaction time $t_L$ | Reaction time $t_S$ | Ratio by weight of polyisocyanate to suspension | Density kg/m$^3$ | Compressive strength kp/cm$^2$ |
|---|---|---|---|---|---|---|---|---|---|---|---|---|
| 41 | 150 | 1.5 | 15 | 75 | 3 | 3 | 15 | 25 | 80 | 2:1 | 12 | 0.15 |
| 42 | 150 | 1.5 | 15 | 150 | 3 | 3 | 15 | 25 | 115 | 1:1 | 20 | 0.3 |
| 43 | 75 | 1.5 | 20 | 150 | 4 | 4 | 15 | 33 | 80 | 1:2 | 32 | 0.3 |
| 44 | 50 | 2.5 | 15 | 150 | 8 | 8 | 15 | 20 | 33 | 1:3 | 59 | 0.2 |
| 45 | 37.5 | 2.5 | 15 | 150 | 8 | 8 | 15 | 20 | 35 | 1:4 | 81 | 0.08 |

What is claimed is:

1. A process for the production of highly filled hydrophobic, hard polyurea foams with gross densities of from 10 to 100 Kg/M$^3$ comprising reacting (a) a polyisocyanate, said polyisocyanate being a liquid water insoluble polyisocyanate, free from ionic groups or groups which are capable of forming ionic groups during the process, said polyisocyanate having a viscosity of more than 200 cP at 25° C, a functionality of greater than 2.1, and an NCO-content of from 20 to 32% by weight, said polyisocyanate being selected from the group consisting of (i) phosgenation products of condensates of aniline or anilines alkyl substituted on the nucleus with aldehydes or ketones, (ii) solutions of distillation residues accumulating during the production of tolylene diisocyanate, diphenylmethane diisocyanate, or hexamethylene diisocyanate, in monomeric polyisocyanates or in organic solvents, (iii) mixtures of said distillation residues, (iv) modified polyisocyanates containing carbodiimide groups, allophanate groups, isocyanurate groups, urea groups, or biuret groups, said modified polyisocyanate prepared by modifying polyisocyanates thermally or catalytically by air, water, urethanes, alcohols, amides or amines, (v) semi-prepolymers obtained by reacting polyisocyanates (i) through (iv) with glycols or polyols, said semi-prepolymer polyisocyanates containing less than 10% by weight of polyols;

(b) a aqueous suspension of inert minerals or hydraulic binders, said suspension having a solids content of from 30 to 80% by weight, at least 50% by weight of the suspended fillers having the particle size of less than 50 microns;

(c) in the presence of a polyether/polysiloxane foam stabilizer, and in the presence of a tertiary amine catalyst, the weight ratio of component (b) to component (a) being between 1:2 and 6:1, the pH value of the aqueous suspension, together with the tertiary amine catalyst, being above 8.

2. A process as claimed in claim 1, wherein at least 50% by weight of the suspended fillers have a particle size of less than 10 microns.

3. A process as claimed in claim 2, wherein at least 50% by weight of the fillers have a particle size of less than 2 microns.

4. A process as claimed in claim 1, wherein the ratio by weight of inorganic fillers dry weight, to organic polymer constituents amounts to between 30:70 and 85:15.

5. A process as claimed in claim 1 wherein the reaction is carried out in the presence of coarsely dispersed inorganic aggregates.

6. A process as claimed in claim 1 wherein stabilized suspensions of inert minerals or hydraulic binders are used.

7. A process as claimed in claim 6, wherein one or more substances from the following classes of compounds are used as stabilizers for the suspensions: salts of any of the following acids: phosphoric acid, pyrophosphoric acid, metaphosphoric acid, polyphosphoric acid, phosphorous acid, polysilicic acids, polyacrylic acids, copolymeric poly(meth) acrylic acid, polymaleic acid, and copolymeric polymaleic acids; water-soluble derivatives of cellulose, starch, alginic acid, and plant gums; polyalcohols; polyamines; and, bentonite.

8. A process as claimed in claim 7, wherein stabilized filler suspensions with a filler content of from 50 to 80% by weight and a viscosity of from 100 to 10,000 cP are used.

* * * * *